Fig. 1.
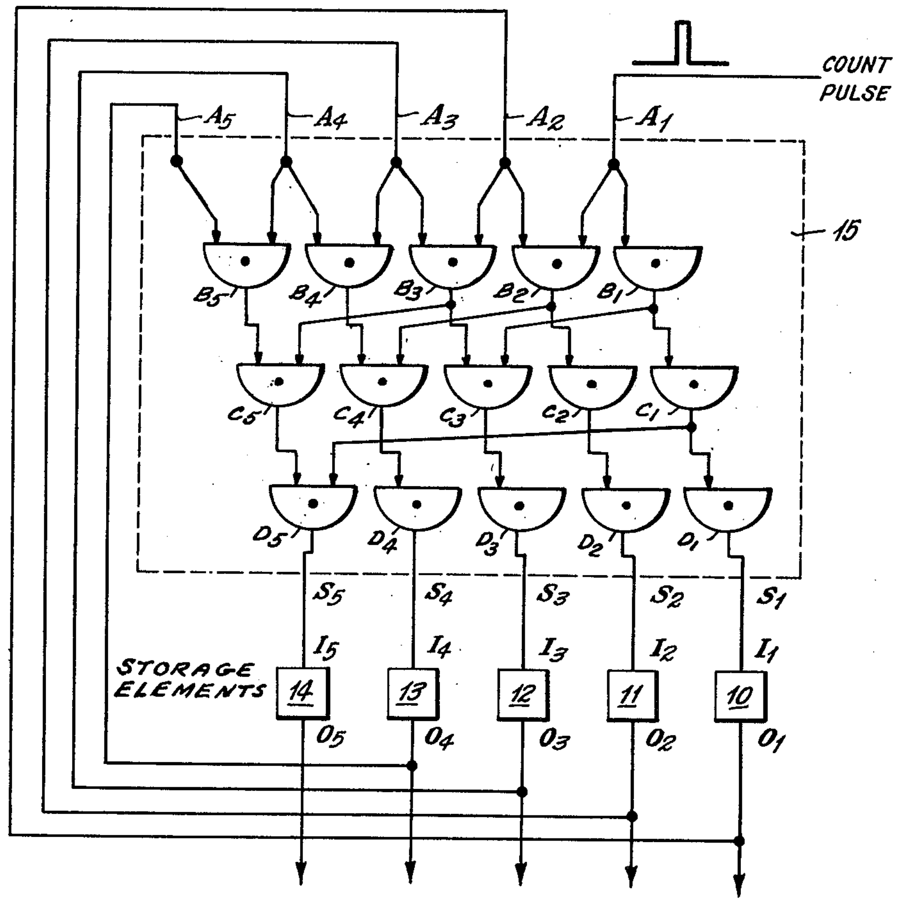
Fig. 3a
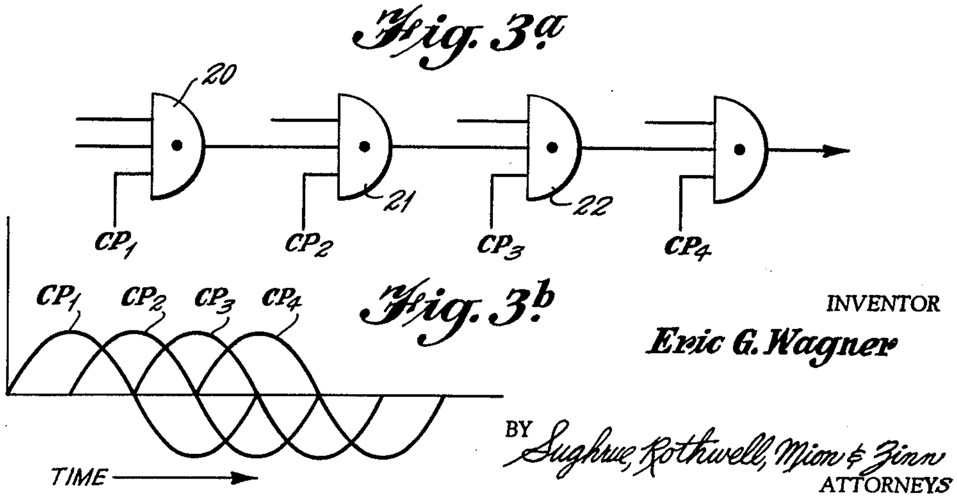
Fig. 3b
INVENTOR
Eric G. Wagner
BY Sughrue, Rothwell, Mion & Zinn
ATTORNEYS April 6, 1965 E. G. WAGNER 3,177,474

HIGH SPEED BINARY COUNTER

Filed Jan. 28, 1959 4 Sheets-Sheet 2

INVENTOR
Eric G. Wagner

BY Sughrue, Rothwell, Mion & Zinn
ATTORNEYS

INVENTOR
Eric G. Wagner

BY Sughrue, Rothwell, Mion & Zinn
ATTORNEYS

INVENTOR
Eric G. Wagner

BY Sughrue, Rothwell, Mion & Zinn
ATTORNEYS

United States Patent Office 3,177,474

Patented Apr. 6, 1965

3,177,474

HIGH SPEED BINARY COUNTER

Eric G. Wagner, New York, N.Y., assignor to International Business Machines Corporation, New York, N.Y., a corporation of New York Filed Jan. 28, 1959, Ser. No. 789,608
21 Claims. (Cl. 340—174)

The present invention relates to a high speed binary counter, and more particularly, to a device which utilizes an input segment net containing a minimum of logical elements in order to avoid the necessity for a carry to ripple through the counter.

Binary counters in the prior art very often must provide time to allow carry pulses to ripple through the stages after a count of 1 has been added. Furthermore, the stages do not all simultaneously reflect the changed count, inasmuch as a carry pulse between two higher order stages will occur after a carry pulse between two lower order stages. While a ripple carry may be advantageous in certain kinds of circuitry, such as that containing vacuum tubes, its use in counter circuitry which contains logical elements having a one time unit delay, such as magnetic cores, can be very time consuming. For example, in an *n* bit counter, a ripple carry from one end to the other would take *n* units of time.

Therefore, one object of the invention is to provide a binary counter having no carry pulses between stages.

Another object of the invention is to provide a binary counter whose stages simultaneously reflect a changed count.

A further object of the invention is to provide a high speed binary counter comprising a segment net having a minimum of interconnected logical elements and also having inputs and outputs, a complementing storage element associated with each segment net output and having one input and one output, means connecting the outputs of said segment net to the inputs of their associated storage elements, means for applying a count signal to one of said segment net inputs, and means for applying selected output signals of said storage elements to the rest of said segment net inputs other than said one segment net input.

Other objects and advantages of the invention will become apparent from the following detailed description taken in connection with the accompanying drawings, in which:

FIGURE 1 is a simplified schematic diagram of the high speed binary counter;

Figure 4A:
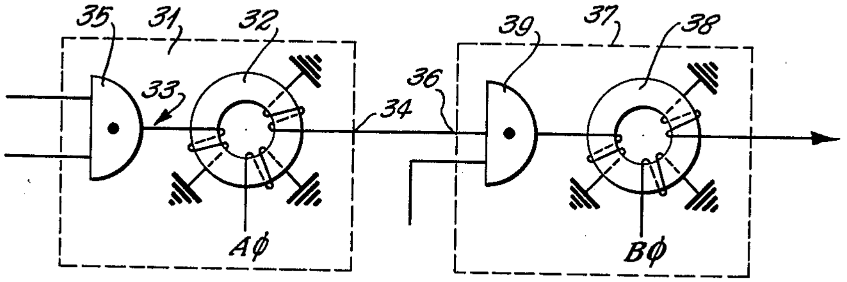
Figure 4B:
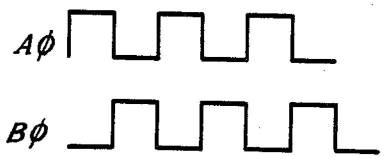
Figure 5:
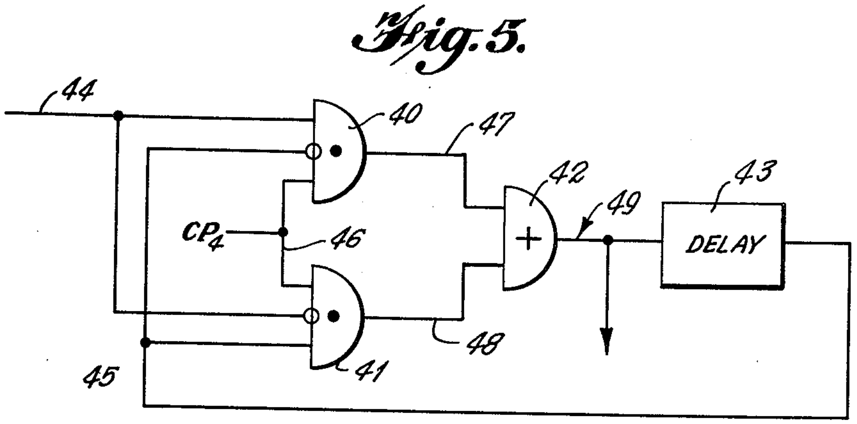
Figure 6:
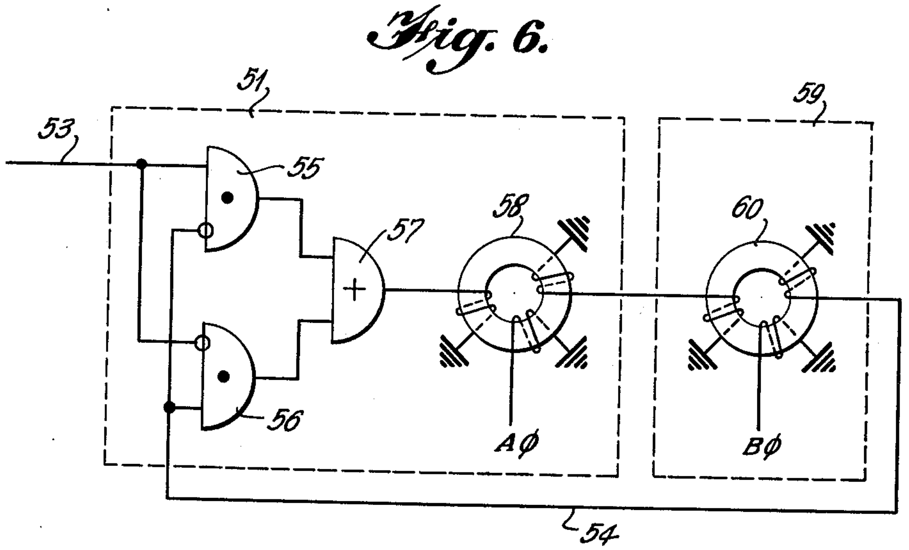
Figure 7:
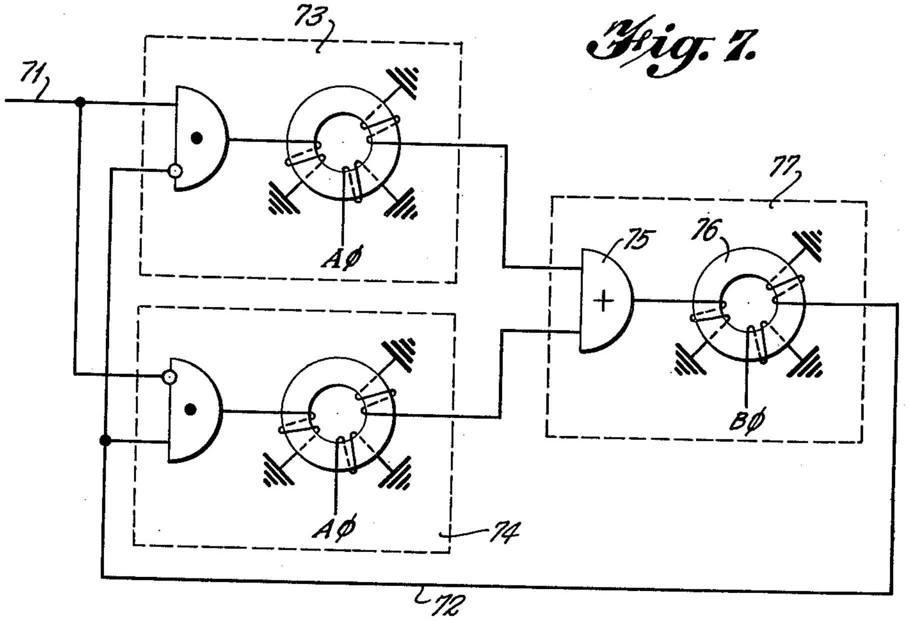

FIGURES 3*a* and 3*b* together show one form of one unit delay AND elements which may be used in the present invention;

FIGURES 4*a* and 4*b* together show another form of one unit delay AND elements which employ magnetic cores;

FIGURE 5 shows one form of a dynamic flip-flop storage element;

FIGURE 6 shows another form of a dynamic flip-flop storage element employing magnetic cores;

FIGURE 7 shows an alternative form of a magnetic core dynamic flip-flop storage element.

While the invention is susceptible of various modifications and alternative constructions, I have shown in the drawings embodiments of the invention. It is to be understood, however, that I do not intend to limit the invention by any such disclosure but aim to cover alternative constructions and uses falling within the spirit and scope of the invention as expressed in the appended claims.

FIGURE 1 shows a simplified schematic diagram of a 5-stage 5-input binary counter employing the principles of the invention. Storage elements 10 to 14 each contain one binary bit value which may be stored in either static or dynamic form. Each storage element must have the property of being complemented each time a pulse appears on its only input lead I. Thus, if a storage element contains a zero binary bit, an input pulse to said storage element will cause a 1 binary bit to be stored therein. Vice versa, an input pulse to a storage element in the binary 1 state will cause that element to change to the binary 0 state.

The inputs to storage units 10 to 14 are generated by a logical segment net 15 having inputs $A_1$ to $A_5$, outputs $S_1$ to $S_5$, and logical elements $B_1$ to $B_5$, $C_1$ to $C_5$, and $D_1$ to $D_5$ which are arranged in levels. A segment net generally may be defined as a circuit with *n* inputs $A_1, A_2, \ldots A_n$, and *n* outputs $S_1, S_2, \ldots S_n$, such that signals simultaneously appear on the $S_1$ to $S_k$ outputs if and only if signals have simultaneously appeared on inputs $A_1$ to $A_k$. The logical elements, which are AND elements having 1 or 2 digital inputs, as shown, plus a clock pulse input, not shown; each being characterized by a one unit delay, are connected to inputs $A_1$ to $A_5$ and to each other so that the outputs of the elements in the B level are connected to inputs of the elements in the C level, and so on as shown, while outputs $\theta_1$ to $\theta_4$ of the storage elements are fed back to inputs $A_2$ to $A_5$ of the segment net 15. Input $A_1$ of segment net 15 is the count input lead, wherein a count of 1 is added to the counter each time a count pulse appears thereon.

Each AND element must have a 1-unit delay between the input and output signals associated with each element. A storage element can also have such a delay, and in the present embodiment, it does. The time interval between any two successive count pulses on count input leads $A_1$ can be no less than the time required for output leads $\theta_1$ to $\theta_5$ to deflect the changed count occasioned by the first of said two successive pulses. Since each of the B, C, D, and storage levels of FIGURE 1 provides a 1-unit delay, the minimum time interval between two successive count pulses is therefore the sum of four unit delays in this particular embodiment of the invention. The count period of the counter is now defined to be this minimum time interval.

Figure 2:
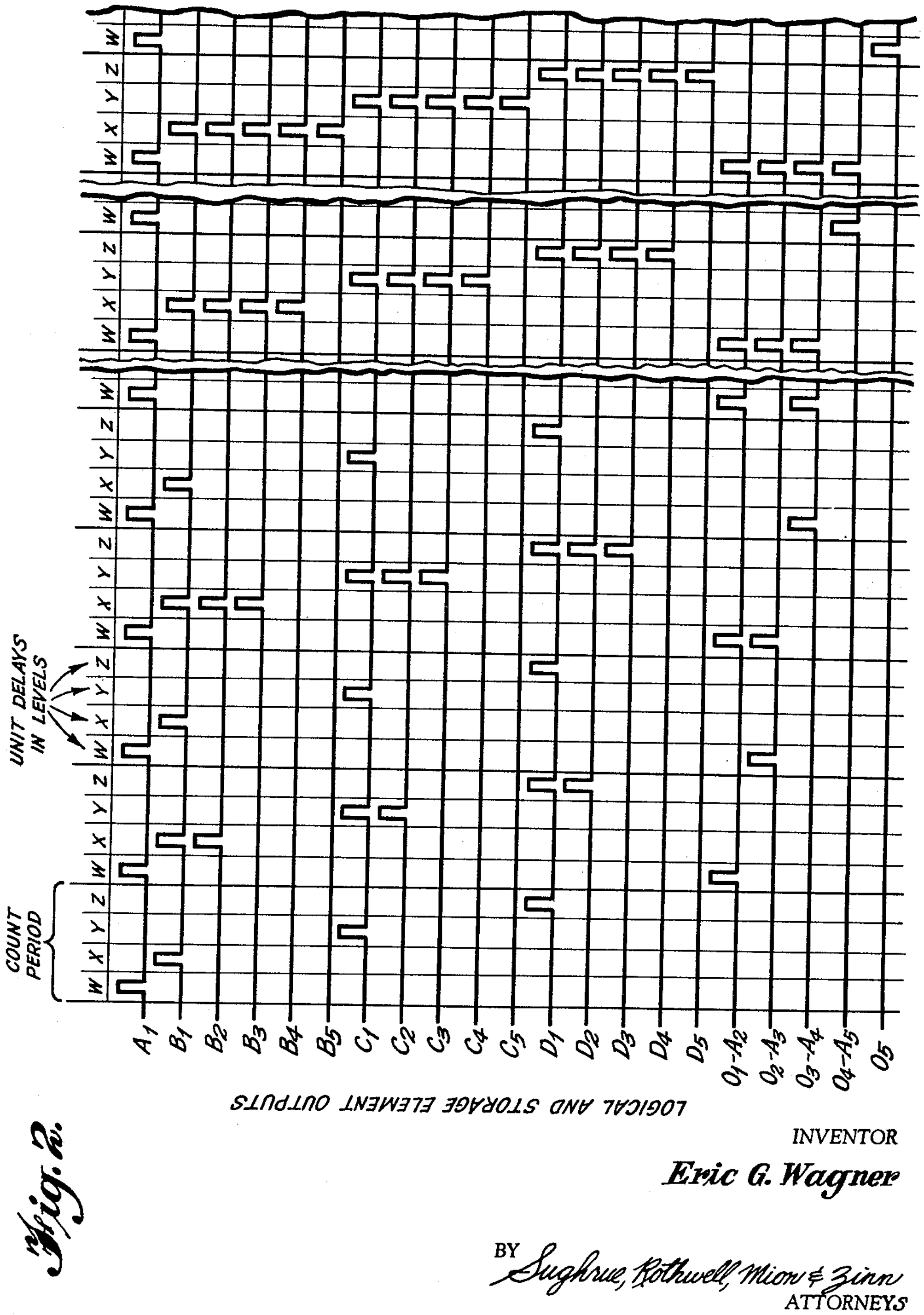
FIGURE 2 is a timing diagram showing the operation of the counter.

The operation of the circuit shown in FIGURE 1 will now be described in connection with FIGURE 2, which shows a timing diagram wherein the action of each logical and storage element is shown with relation to discrete intervals of time during the counting operation. For purposes of explanation, count pulses appear on input $A_1$ at the beginning of a count period although it should be appreciated that they can arrive at almost any interval which is greater than a count period. The count period used with the present embodiment of the invention is made up or contains four unit delays, and in FIGURE 2, each of these time delays is denoted by *w*, *x*, *y* and *z*. It will be assumed that the initial condition of the counter is zero, that is, no output signals appear on outputs $\theta_1$ to $\theta_5$ of the storage elements 10 to 14. When a count pulse appears upon input $A_1$ at the beginning of a *w*-time delay within a count period, only AND element $B_1$ will give an output at the beginning of the *x*-time delay after a 1-unit delay, since AND elements $B_2$ and $B_5$ do not have all the necessary inputs. AND element $C_1$ responds to the output of AND elements $B_1$ and gives an output signal at *y*-time. Furthermore, AND element $D_1$ also gives an output signal at *z*-time on segment net output $S_1$ in response to the signal appearing on the output lead from $C_1$. It should be noted that since none of the AND elements $B_2$ to $B_5$ have generated an output signal, then none of the AND elements $C_2$ to $C_5$ and $D_2$ to $D_5$ are able to pass signals from segment net outputs $S_2$ to $S_5$ to the inputs $I_2$ to $I_5$ storage elements 11 to 14.

However, AND element $B_1$ does eventually provide an input signal to storage element 10 which complements the number 0 previously standing therein, thus changing the count in storage element 10 to a binary 1 representation.

The delayed output signal from storage element 10 reflecting this new count appears on output $O_1$ just in time to be impressed upon input lead $A_2$ of the segment net at the beginning of the next count period. If another count of 1 is being added in this successive count period, as is shown in FIGURE 2, then both AND elements $B_1$ and $B_2$ will be energized and each will emit a pulse at *x*-time after a 1-unit delay. Again, AND elements $B_3$ to $B_5$ will not be energized because of missing inputs. This time, however, both AND elements $C_1$ and $C_2$ will emit pulses, at the beginning of *y*-time, to AND elements $D_1$ and $D_2$. The binary 1 bit which previously had been stored in storage element 10 by the preceding count pulse will now be complemented by the output signal on $S_1$ from AND element $D_1$, thus changing the count in storage element 10 to a binary zero. On the other hand, the output signal from AND element $D_2$ will place a binary 1 bit into storage element 11. The binary counter now contains the decimal number 2 derived by adding together the decimal values associated with each of the binary elements 10 to 14, which have the decimal significance of 1, 2, 4, 8 and 16, respectively.

A third count pulse will complement only storage element 10, leaving storage unit 11 in its previous binary 1 condition. The fourth input count pulse will activate AND elements $B_1$ and $B_2$ since there is also an input on input lead $A_2$ from $\mathbf{0}_1$. Furthermore, AND element $B_3$ is also activated at this time because of inputs on input leads $A_2$ and $A_3$, the latter coming from $\mathbf{0}_2$. Therefore, AND elements $C_1$ through $C_3$ and AND elements $D_1$ through $D_3$ will also be activated in the proper sequence. Since the contents of storage elements 1 through 3 are now complemented by input pulses from elements $D_1$ through $D_3$, the count in these storage elements changes from 011 to 100, which is decimal 4. The manner in which further counts are added to the binary counter shown in FIGURE 1 is now deemed to be obvious from the preceding discussion and from FIGURE 2.

It will now be seen that the advantages of no carry ripple time and simultaneous change of the binary stages accrue from the use of an input segment net in conjunction with complementing storage elements. This is due to the fact that a count of 1 may be added to a binary number by the rote process of simultaneously complementing all of the non-zero (or 1) bits starting from the lowest order of the number up to and including the first zero bit reached. For example, a 1 count added to the binary number 10111 (which is decimal 23) results in the first three 1 bits from the right and the 0 bit being complemented, thus giving an answer of 11000. The segment net outputs provide the necessary number of these simultaneous complementing pulses, since they are generated according to how many successive 1 bits are contained in the previous binary number.

The manner in which the logical elements within the segment net are interconnected will now be described with particular reference to FIGURE 1. However, it should be stated at the outset that the hereinafter described design technique is applicable to the construction of an *n* binary counter utilizing a segment net with AND circuit elements having from two to *r* information signal inputs.

As stated before, a segment net is a circuit with *n* inputs $A_1, A_2, \ldots A_n$, and *n* outputs $S_1, S_2 \ldots S_n$, such that the $S_1$ to $S_k$ outputs come on if only if all the inputs from $A_1$ to $A_k$ are on. It comprises a set of interconnected logical elements such as logical AND elements, each having *r* or less information signal inputs. Each such logical AND element must also provide a one-unit time delay and each must be able to drive at least *r* other elements. These logical AND elements will be arranged in a group of N levels (the inputs to the segment net do not count as a level), where N is the smallest integer greater than or equal to $\log_r n$. Each level will contain *n* logical AND elements, and thus the whole segment net will contain $n \times N$ logical elements. Thus, in FIGURE 1 there are $n=5$ inputs $A_1$ to $A_5$, a set of interconnected logical AND elements $B_1$ to $D_5$, each containing up to $r=2$ information signal inputs, and $N=3$ levels B, C and D, where 3 is the smallest integer greater than or equal to $\log_2 5$. Furthermore, there are five logical AND elements on each of the three levels, and no logical element drives more than two other logical elements.

The logical AND elements in the segment net are interconnected according to the following formula: Let $H_k$ represent a logical element contained in the *m*th level (of an N level net) at the *k*th bit position (of an *n* bit input net, where $H_1, H_2, \ldots H_k$ are arranged from right to left since it is conventional to have the low order bit to the right). Furthermore let $G_k$ represent a logical element in the preceding $(m-1)$th level; or where the *m*th level is taken to be the first level of a net, then $G_k$ represents the *k*th input to the net. The inputs to the $H_k$ logical element must then be connected to outputs from logical elements $$G_k,\ G_{k-r}m-1,\ G_{k-2r}m-1,$$
$$G_{k-3}m-1 \ldots G_{k-r}m_{+r}m-1$$

where these G elements exist. The number of inputs to the $H_k$ logical element, however, cannot exceed the value of the smallest integer greater than or equal to the value of $k/r^{m-1}$, and of course, in no case must the number of inputs to a logical element exceed the value of *r*.

The embodiment shown in FIGURE 1 can now be analyzed in light of the above described criteria. As stated before, the segment net there shown consists of $n=5$ inputs ($A_1$ to $A_5$), and the maximum number of *r* inputs to any one logical AND element is 2. The first *m*th level to be considered is the $B_1$ to $B_5$ level, where $m=1$. The $(m-1)$th level therefore consists of inputs $A_1$ to $A_5$. Since the general formula requires that $H_k$ be connected to $G_k$, $G_{k-r}m-1$, etc., then $B_1$ is connected to $A_1$, $A_{1-2}1-1$, $A_{1-2.2}1-1$, etc., which when simplified, results in $B_1$ being connected to $A_1$, $A_0$, $A_{-1}$, etc. But since no logical AND elements exist with designations lower than $A_1$, there obviously can be no inputs to $B_1$ other than from $A_1$. The elements $B_2$ is connected to $A_2$, $A_{2-2}1-1$, $A_{2-2.2}1-1$, etc., which when simplified, results in $B_2$ connected only to $A_2$ and $A_1$. The above interconnections of $B_1$ and $B_2$ also satisfy the second criterion in that the number of inputs to each does not exceed the value of the smallest integer greater than or equal to the value of $k/r^{m-1}$. Thus, for $B_1$, this value is $1/2^{1-1}=1/2^{\circ}=1$, and for $B_2$, this value is $2/2^{1-1}=2$. Still remembering that $m=1$ (since the $B_1$ to $B_5$ level is the first in a group of $N=3$ levels), $B_3$ would appear to be connected to $A_3$, $A_{3-2}1-1$, and $A_{3-2.2}1-1$, or in other words, to $A_3$, $A_2$, and $A_1$. However, no logical AND element can have more than $r=2$ inputs, even though the expression $k/2^{m-1}$ apparently permits $B_3$ to have $$3/2^{1-1}=3$$

inputs. Thus, $B_3$ can only be connected to $A_3$ and $A_2$. By similar reasoning, $B_4$ is connected to $A_4$ and $A_3$, while $B_5$ is connected to $A_5$ and $A_4$.

Since the number of N levels necessary in a segment net (having *n* inputs and which utilizes logical AND elements each having a maximum of *r* inputs or less) is equal to the smallest integer greater than or equal to $\log_r n$, then the present embodiment requires that $N=3$, since $\log_2 5=2 \ldots$ It is seen, therefore, that two more levels $C_1$ to $C_5$, and $D_1$ to $D_5$ are required. Since $m=2$ for the $C_1$ to $C_5$ level, then $r^{m-1}=2^{2-1}=2$. The element $C_1$ is connected to $B_1$, $B_{1-r}m-1$, $B_{1-2r}m-1$, etc., which simplifies to $B_1$, $B_{-1}$, $B_{-3}$, etc. Because elements $B_{-1}$, $B_{-3}$, etc., do not exist, $C_1$ can only receive an input from $B_1$. Element $C_2$ is connected only to $B_2$, while element $C_3$ is connected to $B_3$ and $B_{3-2}$ (or, in other words, to $B_1$). Element $C_4$ is connected to $B_4$ and $B_2$, while element $C_5$ is connected only to elements $B_5$ and $B_3$, since it cannot have more than $r=2$ inputs.

The third and last level $D_1$ to $D_5$ (where $m=3$) is also connected according to the general formulas. Element $D_1$ to $D_4$ is connected to $C_5$ and $C_{5-2}2$ (or, in other words, to $C_1$). When utilizing the segment net in a counter structure, the $S_k$ output of a logical AND element in the last level of the net is connected to a $k$th complementing storage element, whose output $\theta_k$ in turn is fed back to an input $A_{k+1}$. The pulse to be counted is fed into the first input $A_1$ of the segment net.

A segment net constructed according to the above-described general formulas will have the following valuable properties:

(1) All of its outputs occur simultaneously.

(2) It provides the fastest possible circuit time between application of inputs and occurrence of simultaneous outputs that can be obtained when using logical AND circuit elements with unit delay.

(3) It is the most minimal circuit with simultaneous output that can be built from logical AND elements with a maximum of $r$ inputs, i.e., it contains the least number of such elements.

(4) No logical element in the circuit will have to drive more than $r$ other logical elements, where $r$ is the maximum number of inputs that an element can have.

A binary counter utilizing a segment net in which the AND elements have no inherent delay will still be operable, providing the count pulse and the storage element feedback outputs are synchronized. However, it will not necessarily have any minimal properties if constructed as described above. The principal advantages of the circuitry occur when one is restricted to the use of AND elements having an inherent unit delay and a limit on the number of inputs allowed.

FIGURES 3 and 4 show two alternative embodiments of one unit delay AND logical elements. In FIGURE 3*a*, a hemisphere containing a dot represents a logical AND gate requiring at least two information signal inputs together with a clock pulse timing signal CP in order to generate an output signal. Such AND gates may be composed of diodes, vacuum tubes, or the like, as is well known in prior art. The element may also contain an amplification stage if so desired, depending upon the engineering requirements. Several phased clock pulse signals for a combination of AND gates are provided such as are shown in FIGURE 3*b*. $CP_1$, for example, occurs ahead of $CP_2$, which in turn occurs ahead of $CP_3$. $CP_1$ then repeats itself again and the cycle continues in the described manner. If AND gates are connected in series, such as is shown in FIGURE 3*a*, and each is supplied with a different clock pulse signal, then an output pulse from an AND gate which is the result of the logical combination of two or more information input signals will not be generated until the associated clock pulse signal arrives. This results in a time delay between the input and output signals of an AND gate. The output signal of AND gate 20, for example, arrives at one of the information signal inputs of AND gate 21 at time $CP_1$, neglecting any inherent delay in the gate due to stray capacitances, etc. The other information signal input to AND gate 21 also arrives at time $CP_1$. However, an output signal from AND gate 21 cannot be generated until $CP_2$ occurs thus creating another delay in the series chain of AND gates. Thus the time delay between input and output signals from an AND gate can be considered as a unit delay. Where, for example, the number of N levels in a counter segment net is not more than four or five, then practical engineering considerations would permit a different clock pulse signal to be provided for each such level. The period of any one of the phased clock pulse signals is then considered to be the count period of the counter, and the time interval between successive count input pulses on input lead $A_1$ of FIGURE 1 cannot be less than a clock pulse period or a multiple thereof.

FIGURE 4*a* shows AND logical elements with unit delays which employ magnetic cores. Only a simple schematic is shown, since the engineering requirements to perform the hereinafter described function of each unit are by now well known in the art. Enclosed block 31 is an AND element having a unit delay, which includes a magnetic core 32 having an input 33 from some well known AND gate 35 which itself has two or more information signal inputs. Because of the inherent nature of magnetic material, information from the AND gate 35 is first read into core 32 during a B-phase time, after which a read pulse at an A-phase time is applied thereto in order to transfer information therein to the input 36 of a succeeding serially connected AND element 37. All other information signal inputs to element 37 also arrive at A-phase time. The logical AND combination of these input signals is almost simultaneously stored in magnetic core 38. At the next B-phase time, information is then read from core 38 out into a further succeeding AND element, or to a storage element. The relationship of the A and B-phased read pulses is shown in FIGURE 4*b*, and it is seen that each alternates with the other or, in other words, each is shifted in phase 180° from each other. It should be noted that since the inputs to core 32 of AND element 31 arrive in B-phase time, there is a time delay between these input pulses at B-phase time and the output pulses on 34 at A-phase time. The same is true with the A-phase inputs to AND element 37 and the B-phase output signal therefrom. This time delay is considered to be a unit time delay for purposes of utilizing such AND elements in a counter segment net.

FIGURES 5, 6 and 7 show various forms of complementing dynamic storage units which may be used in the present invention. FIGURE 5, in particular, shows one form of a complementing dynamic flip-flop circuit using a conventional OR gate 42 and INHIBIT gates 40 and 41 comprised of diodes, vacuum tubes or the like. This circuit is considered to be in the binary 1 state if a pulse is circulating in the loop consisting of the delay line 43 and its serially connected input gates 41 and 42. If there is no pulse circulating in this loop then the circuit is in the binary zero state. Inhibit gate 40 can initiate this re-circulating pulse if there are input signals on both 44 and 46, together with the absence of a signal on 45. Conversely, inhibit gate 41 can only generate an output signal, thus maintaining the re-circulation of this pulse, if there are input signals on 45 and 46, together with the absence of a signal on 44. OR circuit 42 passes any signal appearing on either 47 or 48. Input lead 46 has a phased clock pulse signal CP applied thereto for purposes of timing, and this clock pulse also provides a unit delay between the input signals to gates 40 and 41, and the output signal at 49. The delay line 43 is of such a length as to provide the entire loop with a delay equal to one clock pulse period so as to return the re-circulating pulse to lead 45 in time for it to be regenerated. In operation, a properly phased input signal on lead 44, when no pulse is being circulated in the loop, will cause inhibit gate 40 to generate a pulse which is placed into the delay line 43 by OR gate 42. The flip-flop has thus been placed into its binary 1 state. As long as no further count pulse appears on input lead 44, the pulse re-circulating in the loop will continue to do so, since inhibit gate 41 can regenerate same due to the absence of signal 44. If, however, a count pulse appears on lead 44 at the same time that the re-circulating pulse appears on lead 45, then neither inhibit gate 40 or 41 will generate a signal, thus stopping the re-circulation and changing the dynamic flip-flop to its binary zero state.

FIGURE 6 shows a form of a dynamic flip-flop employing magnetic cores. The circuits in block 51 perform an EXCLUSIVE OR function, which involves the generation of an output signal at 52 in response to the application of an input signal either at 53 or 54, but not both. The input signals at 53 or 54 will be applied at a B-phase time and the result stored in core 58. Gates 55, 56 and 57 perform the same function as explained in connection with FIGURE 5. This stored result is then read from core 58 at A-phase time into block 59, which is essentially a 1-input OR circuit employing a single core 60. The core 60 is then read at B-phase time and its output is connected to input 54 of block 51. The A and B-phased read-out signals are in the same relationship as is shown in FIGURE 4*b*.

FIGURE 7 shows an alternative form of a magnetic core dynamic complementing flip-flop. At a B-phase time, an input signal on lead 71 in the absence of a signal on lead 72 will cause circuit 73 to emit a pulse at the following A-phase time to the OR gate 75 which stores it in core 76. This pulse is kept circulating in the loop comprising circuits 72 and 77 as long as no further input pulses arrive on 71. The flip-flop is returned to its zero state when a pulse does appear on lead 71, in which event neither of the circuits 73 or 72 can generate an output pulse to circuit 77.

Other forms of magnetic core logical elements may be used than are shown in the above figures. For example, the logical core elements shown and described in the copending U.S. applications Serial No. 689,827, filed October 14, 1957 in behalf of J. A. Kauffmann and now abandoned, and Serial No. 692,131, filed October 24, 1957 and now Patent No. 3,090,036 in behalf of J. A. Kauffmann, may be utilized in the counter by one skilled in the art.

A form of static binary bit storage may also be employed as the storage element in the present invention. For example, the Eccles-Jordan "scale-of-2" complementing flip-flop shown in FIGURE 19–15 in Electron-Tube Circuits by S. Seely, published in 1950 by the McGraw-Hill Book Company, Inc., may be used to receive the output pulses from the segment net. This well known circuit consists of two cross coupled tubes, with a pulse on a single input lead causing these tubes to change state. If the output of this storage flip-flop is required to be timed with a count signal arriving at a segment net input, then a simple read gate may be attached to said output.

It is important to remember that an output from a storage element in the segment net binary counter must appear at the segment net inputs in the same phase as the count input pulse appearing on the first segment net input. This is because the AND logical elements contained in the segment net are operated by the simultaneous application of input signals to their input leads. Furthermore, it should be noted that there may be times that signals from storage units appear at the segment net inputs $A_2$ to $A_k$ when there is not input count signal appearing on $A_1$. This situation can prevail if count impulses are not presented to the counter in successive count periods, or if a magnetic core dynamic flip-flop circuit is being utilized as a storage element. It is seen that the magnetic core flip-flop circuits shown in FIGURES 6 and 7 will produce an output signal at every A and B phase, respectively, if they are in their 1 state, although the count period of a particular counter may include many repetitions of the A and B-phase clock signals, depending upon the number of N levels contained in the segment net. However, the fact that some of the AND logical elements in the first few levels of the segment net may thus generate output signals in response to input signals coming from the storage unit is of no importance, since any such generated signals cannot possibly produce outputs from the last level of a segment net without there having been a count impulse signal on segment net input $A_1$.

Various other modifications of both the segment net and storage elements can obviously be made without departing from the scope of the invention. As noted before, any *n* bit counter utilizing AND logical elements with *r* signal information inputs may be constructed using the principles hereinbefore described. Furthermore, the components which can be used in the logical AND elements and in the storage elements are various and should not be limited to those embodiments particularly shown in the figures. The timing requirements have also been outlined and should prove of no difficulty to one skilled in the art in constructing a modification of the circuit.

I claim:

1. In a high speed binary counter, a gating system comprising an array of interconnected logic elements arranged in a matrix of channels and levels; a plurality of inputs pertaining to respective ones of said channels and connected only to the logic elements of the lowest level in the respective channels; a plurality of outputs connected only to logic elements of the highest level, in the relation of one output for each channel of the array of logic elements; a number of complementing storage elements in a series proceeding from lower to higher significance, there being one of said storage elements for each of said outputs of the gating system, each of said storage elements having an input and an output; means connecting the outputs of said gating system to the inputs of the respective storage elements; means for applying a count signal to an input of the gating system connected to the lowest level logic element of the channel associated with the least significant one of said storage elements, and means for connecting the outputs of said storage elements respectively to inputs of said gating system pertaining to channels which relate to storage elements of respectively higher significance.

2. A high speed binary counter as defined in claim 1, wherein each of the inputs to said gating system is connected to the lowest level logic devices of two adjacent channels.

3. A high-speed binary counter in accordance with claim 1 in which each complementing storage element is a static bistable device.

4. A high-speed binary counter in accordance with claim 1 in which each complementing storage element is a dynamic bistable device.

5. A high-speed binary counter in accordance with claim 4 in which each dynamic bistable storage element includes magnetic cores as components thereof.

6. A high-speed binary counter comprising in combination a gating system having a group of inputs and a group of outputs, the number of inputs being the same as the number of outputs; a group of complementing storage elements each having one input and one output, the number of storage elements being the same as the number of gating system outputs; means for connecting each gating system output to the input of a related one of said storage elements; means for applying a count signal to one of said gating system inputs; and means for connecting all but one of the storage element outputs to the rest of said gating system inputs in a 1-to-1 correspondence.

7. A high-speed binary counter in accordance with claim 6 in which each complementing storage element is a static bistable device.

8. A high-speed binary counter in accordance with claim 6 in which each complementary storage element is a dynamic bistable device.

9. A high-speed binary counter in accordance with claim 8 in which each dynamic bistable storage element includes magnetic cores as components thereof.

10. A high-speed binary counter comprising a segment net having interconnected logical circuit elements, said segment net also having a group of inputs equal in number to a group of outputs therefrom, said logical circuit elements consisting of one unit delay AND circuits which are arranged in a plurality of channels, each comprising an equal number of serially connected AND circuits, the AND circuits of all of the channels being thereby aligned across the channels in a plurality of levels, each containing an equal number of AND circuits, said segment net inputs being connected only to the AND circuits of one terminal level and said segment net outputs being connected only to the AND circuits of the other terminal level; a group of complementing storage elements each having an input and an output, there being one storage element input connected to each of said segment net outputs, means for applying a count signal to one of said segment net inputs, and means for applying selected storage element outputs to selected segment net inputs other than said one count input.

11. A high-speed binary counter in accordance with claim 10 in which each complementing storage element is a static bistable device.

12. A high-speed binary counter in accordance with claim 10 in which each complementing storage element is a dynamic bistable device.

13. A high-speed binary counter in accordance with claim 12 in which each logical element and storage element includes magnetic cores as components thereof.

14. A high-speed binary counter comprising a gating system, said system being divided into a number of *n* signal channels, each channel having a plurality of logical elements serially connected, the logical elements in the same positions in all of said channels defining corresponding levels, means further connecting selected elements in one channel at one level thereof to selected elements of another channel at a different level thereof, a complementing storage element associated with each of said signal channels, means for applying a count signal to selected elements of one terminal level, means connecting outputs of logical elements defining the other terminal level to said associated storage elements, and means to connect selected outputs of said storage elements to the remaining logical elements defining said one terminal level.

15. A high-speed counter in accordance with claim 14 in which said logical elements in said gating system consist of one unit delay AND circuits, each of said AND circuits having a maximum of *r* inputs thereto.

16. A high-speed counter in accordance with claim 15 in which each level of said gating system is defined by an equal number of one unit delay AND circuits.

17. A high-speed counter in accordance with claim 16 in which the number of levels in the gating system is equal to the smallest integer greater than or equal to the value of $\log_r n$.

18. A high-speed binary counter in accordance with claim 17 in which each complementing storage element is a static bistable device.

19. A high-speed binary counter in accordance with claim 17 in which each complementing storage element is a dynamic bistable device.

20. A high-speed binary counter in accordance with claim 19 in which logical element and storage element includes magnetic cores as components thereof.

21. A high speed binary counter comprising a gating system having inputs and outputs, said gating system consisting of logical elements, said elements each having at least one information input and being arranged in a plurality of channels and levels according to the formula $$N=\log_r n$$

where

N is the total number of levels (the smallest integer equal to or greater than $\log_r n$)
*r* is the number of information inputs to each logical element
*n* is the total number of channels said information inputs of individual logical elements $H_k$ from selected levels and channels being interconnected to the outputs of logical elements $$G_k,\ G_{k-r}m-1,\ G_{k-2r}m-1,\ G_{k-3r}m-1$$
$$G_{k-r}m_{+r}m-1 \text{ (where these G elements exist)}$$

where

*m* is the particular level selected
$H_k$ is the selected element in the *m*th level of the N level system
*k* is the channel in the selected level in the manner of increasing order from right to left
G is the logical element in the preceding $(m-1)$ level a group of complementing storage elements each having an input and an output, means connecting the outputs of said gating system to respective inputs of said storage elements, means for applying a count signal to one of said gating system inputs, and means for applying selected output signals of said storage elements to the rest of said gating system inputs other than said one gating system input.

References Cited by the Examiner

UNITED STATES PATENTS

| | | | |
|---|---|---|---|
| 2,828,477 | 3/58 | Lanning | 340—174 |
| 2,884,625 | 4/59 | Kippenhan | 340—174 |
| 2,894,684 | 7/59 | Nettleton | 340—147 |
| 2,962,212 | 11/60 | Schneider | 235—92 |

IRVING L. SRAGOW, *Primary Examiner.*

EVERETT R. REYNOLDS, *Examiner.*